United States Patent
Coleman et al.

(10) Patent No.: US 11,716,403 B2
(45) Date of Patent: *Aug. 1, 2023

(54) INLINE SPF SERVICE PROVIDER DESIGNATION

(71) Applicant: Fraudmarc Inc., Atlanta, GA (US)

(72) Inventors: Keith Wayne Coleman, Atlanta, GA (US); Richard Duncan, Atlanta, GA (US)

(73) Assignee: Fraudmarc Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,879

(22) Filed: May 30, 2022

(65) Prior Publication Data

US 2022/0294873 A1    Sep. 15, 2022

Related U.S. Application Data

(63) Continuation of application No. 17/504,433, filed on Oct. 18, 2021, now Pat. No. 11,349,945.
(Continued)

(51) Int. Cl.
*G06F 15/16* (2006.01)
*H04L 67/563* (2022.01)
(Continued)

(52) U.S. Cl.
CPC ............ *H04L 67/563* (2022.05); *H04L 51/48* (2022.05); *H04L 67/1012* (2013.01); *H04L 67/51* (2022.05); *H04L 61/4511* (2022.05)

(58) Field of Classification Search
CPC ....... H04L 67/563; H04L 67/51; H04L 51/48; H04L 67/1012; H04L 61/4511
(Continued)

(56) References Cited

U.S. PATENT DOCUMENTS

| 8,090,940 | B1 * | 1/2012 | Fenton | H04L 51/212 |
| | | | | 713/160 |
| 8,392,357 | B1 * | 3/2013 | Zou | H04L 51/212 |
| | | | | 715/752 |

(Continued)

OTHER PUBLICATIONS

U.S. Non-Final Office Action dated Jan. 12, 2022 cited in U.S. Appl. No. 17/504,423, 13 pgs.
(Continued)

*Primary Examiner* — Alicia Baturay
(74) *Attorney, Agent, or Firm* — Bekiares Eliezer LLP

(57) ABSTRACT

Sender Policy Framework (SPF) is one of the most widely used methods of distinguishing electronic mail that is authorized by the purported sending domain from unauthorized mail. SPF policies are published into a domain's DNS and then looked up and evaluated by mail receivers. Due to the complexity and limitations of the SPF specification, implementation mistakes are widespread. This problem is compounded by the common practice of nesting SPF policies which introduces hidden risks, particularly exceeding DNS lookup limits. To address these issues, inline service provider designation may be configured to capture the benefits of existing techniques without their associated costs. Additionally, the domain owner may enjoy simplified SPF service provider onboarding and policy failover redundancy to protect against SPF service provider disruptions, thus improving policy availability uptime.

20 Claims, 5 Drawing Sheets

Related U.S. Application Data

(60) Provisional application No. 63/092,873, filed on Oct. 16, 2020.

(51) Int. Cl.
  *H04L 67/1012* (2022.01)
  *H04L 51/48* (2022.01)
  *H04L 67/51* (2022.01)
  *H04L 61/4511* (2022.01)

(58) Field of Classification Search
  USPC ...................................................... 709/206
  See application file for complete search history.

(56) References Cited

U.S. PATENT DOCUMENTS

| | | | | |
|---|---|---|---|---|
| 11,019,076 | B1* | 5/2021 | Jakobsson | H04L 51/212 |
| 11,171,939 | B1* | 11/2021 | Blank | H04L 63/18 |
| 11,200,581 | B2* | 12/2021 | Williams | H04L 67/566 |
| 11,212,245 | B1* | 12/2021 | Ding | H04L 63/1483 |
| 11,223,599 | B1* | 1/2022 | Mielke | H04L 63/0823 |
| 11,349,945 | B2* | 5/2022 | Coleman | H04L 67/1012 |
| 11,463,392 | B2 | 10/2022 | Coleman et al. | |
| 2005/0144451 | A1* | 6/2005 | Voice | H04L 63/126 |
| | | | | 713/170 |
| 2006/0031319 | A1* | 2/2006 | Nelson | G06Q 10/107 |
| | | | | 709/206 |
| 2006/0179113 | A1* | 8/2006 | Buckingham | H04L 51/212 |
| | | | | 709/225 |
| 2008/0184366 | A1* | 7/2008 | Alperovitch | H04L 51/212 |
| | | | | 709/206 |
| 2008/0189770 | A1* | 8/2008 | Sachtjen | H04L 63/10 |
| | | | | 726/4 |
| 2008/0282344 | A1* | 11/2008 | Shuster | H04L 51/212 |
| | | | | 726/21 |
| 2008/0307226 | A1* | 12/2008 | Chow | H04L 63/126 |
| | | | | 709/206 |
| 2009/0147936 | A1* | 6/2009 | Won | H04M 3/38 |
| | | | | 379/201.02 |
| 2010/0121928 | A1* | 5/2010 | Leonard | H04L 63/1433 |
| | | | | 709/206 |
| 2013/0086187 | A1* | 4/2013 | Cohen | H04L 63/126 |
| | | | | 709/206 |
| 2014/0181516 | A1* | 6/2014 | Yoshioka | H04L 9/3236 |
| | | | | 713/168 |
| 2014/0215571 | A1* | 7/2014 | Shuster | H04L 63/1483 |
| | | | | 726/4 |
| 2017/0093772 | A1* | 3/2017 | Gupta | H04L 67/566 |
| 2018/0227259 | A1* | 8/2018 | Gupta | H04L 51/48 |
| 2019/0141077 | A1* | 5/2019 | Tyler | H04L 63/1483 |
| 2019/0222608 | A1* | 7/2019 | Naccarato | H04L 51/212 |
| 2019/0379660 | A1* | 12/2019 | Thirumavalavan | H04L 51/046 |
| 2020/0213332 | A1* | 7/2020 | Thirumavalavan | H04L 63/126 |
| 2021/0126942 | A1* | 4/2021 | Fantham | H04L 51/04 |
| 2021/0152610 | A1* | 5/2021 | Fryback | H04L 63/205 |
| 2021/0266294 | A1* | 8/2021 | Chechik | H04L 51/222 |
| 2021/0289001 | A1* | 9/2021 | Wilson | H04L 63/101 |
| 2021/0344721 | A1* | 11/2021 | Coleman | H04L 9/3247 |
| 2021/0352093 | A1* | 11/2021 | Hassanzadeh | H04L 63/1425 |
| 2022/0014543 | A1* | 1/2022 | Jakobsson | H04L 63/1425 |
| 2022/0124059 | A1 | 4/2022 | Coleman et al. | |
| 2022/0124165 | A1 | 4/2022 | Coleman et al. | |
| 2023/0026045 | A1 | 1/2023 | Coleman et al. | |

OTHER PUBLICATIONS

Lars Lind Nilsson et al., "What does a "-all" do in an included (secondary) SPF record?" Super User, Retrieved Jan. 8, 2022 from https://superuser.com/questions/1167143/what-does-a-all-do-in-an-included-secondary-spf-record, Jan. 14, 2017, 4 pgs.

Hakan Lindqvist et al., "SPF with -all includes directive with ~all?" Server Fault, Retrieved January 8, 202 from https://serverfault.com/questions/848711/spf-with-all-includes-directive-with-all, May 8, 2017, 5 pgs.

Roaima et al., "Adding an SPF record for a 3rd party, but don't have one for my own domain," Server Fault, Retrieved Jan. 8, 2022 from https://serverfault.com/questions/734297/adding-an-spf-record-for-a-3rd-party-but-don't-have-one-for-my-own-domain/734308, Nov. 9, 2015, 6 pgs.

MadHatter et al., "What are SPF records, and how do I configure them?" Server Fault, Retrieved Jan. 8, 2022 from https://serverfault.com/questions/369460/what-are-spf-records-and-how-do-i-configure-them/369478#369478, Mar. 4, 2012, 7 pgs.

* cited by examiner

INLINE SPF SERVICE PROVIDER DESIGNATION

RELATED APPLICATIONS

This is a continuation of U.S. application Ser. No. 17/504,433 filed on Oct. 18, 2021, which issues on May 31, 2022 as U.S. Pat. No. 11,349,945, which claims benefit under the provisions of 35 U.S.C. § 119(e) of U.S. Provisional Application No. 63/092,873 filed on Oct. 16, 2020, which are incorporated herein by reference.

Related U.S. patent application Ser. No. 17/504,423 filed on Oct. 18, 2021, in the name of Keith Wayne Coleman and Richard Duncan, entitled "REGULATION OF SPF POLICY TERMS," assigned to the assignee of the present application, is hereby incorporated, in its entirety, by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to email, identity, security, SMTP, DNS, DMARC, and SPF.

BACKGROUND

Organizations often utilize third party services that may involve sending email messages on their behalf. Vendors in turn often publish corresponding Sender Policy Framework (SPF) policies crafted to allow verification of messages sent by their servers or servers that are, in turn, contracted to send on their behalf. Thus, when a vendor publishes a policy that is inadequate, incompetent, or error prone, the domain that includes such a policy inherits such problems created outside of their control, i.e., the organization lacks sovereignty over the set of IPs that they may declare as legitimate senders for them.

The DNS querying term constraint specification is a common problem encountered by domain owners who utilize a significant compliment of service providers, the operations of which involve the sending of email on behalf of the client domain. In certain aspects, the limit may be ten DNS queries. Upon breaching this threshold, an exception to the policy evaluation process may be generated resulting in an SPF permerror.

Moreover, as many service providers themselves manage include-able SPF policies with a multiplicity of DNS querying terms, their clients in turn accumulate those lookup counts into the including policy. Some common vendors, in fact, already exceed this threshold, whereby any domain including them may also suffer the querying term count threshold breach.

As SPF-implementing Email Service Providers (ESPs) sometimes suffer other common problems in their policies, e.g., circular-evaluation loops, void-lookup limits, and multiple redirect terms, client policies become prone to the errors realized by such problems, effectively rendering authentication checks imprecise and unreliable. In short, by using external service providers, domain message validity checks are at the mercy of policies developed outside of an organization's governance.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
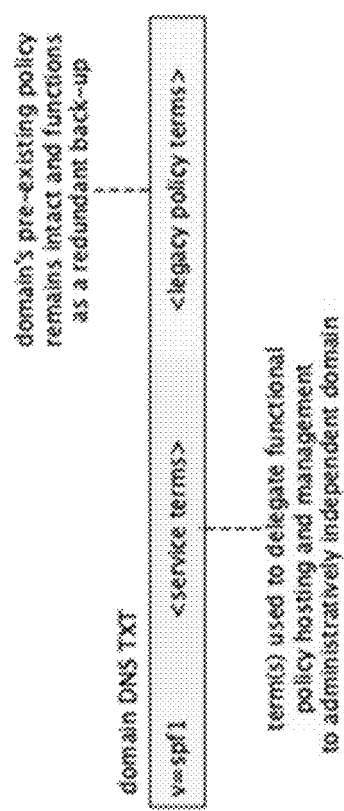
FIG. 1 illustrates an SPF schema consistent with embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of SPF1, embodiments of the present disclosure are not limited to use only in this context.

Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Sender Policy Framework (SPF) is one of the most widely used methods of distinguishing electronic mail that is authorized by the purported sending domain from unauthorized mail. SPF policies are published into a domain's DNS and then looked up and evaluated by mail receivers. Due to the complexity and limitations of the SPF specification, implementation mistakes are widespread. This problem is compounded by the common practice of nesting SPF policies which introduces hidden risks, particularly exceeding DNS lookup limits. Existing methods of addressing these problems typically come at the cost of further obfuscating the intent of the SPF policy and may defeat secondary uses of SPF policies such as domain ownership verification by email service providers.

Embodiments of the present disclosure provide inline service provider designation configured to capture the benefits of existing techniques without their associated costs. Additionally, the domain owner may enjoy simplified SPF service provider onboarding and policy failover redundancy to protect against SPF service provider disruptions, thus improving policy availability uptime.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Inline Service Delegation

A method for authorizing messages from Email Service Providers (ESPs) that send mail using infrastructure outside of the control of the authorizing domain is to use designated sender mechanisms in the SPF policy hosted by the Administrative Management Domain (ADMD). A common method for authorizing many such email service providers is to add a corresponding include term to the domain's SPF policy. For example, the following policy depicts how Google email service may be specified:

"v=spf1 <other policy terms> include:spf.google.com <other policy terms>"

This inlined term to designate service authorization is a feature of the SPF protocol that facilitates adding multiple such providers within a single policy. There are multiple reasons why domain owners retain SPF service providers, including, for example, but not limited to:

a. personnel within the organization do not have the required expertise to manage the complexities of SPF;
b. the policies required to support the domain's existing sending infrastructure requires special techniques to overcome problems, e.g., the 10 DNS querying term constraint; and
c. operational constraints necessitate using an external service for SPF management.

Typically, an SPF service provider requires the client to publish an SPF policy in the domain's DNS that designates a separately-hosted policy or DNS target at the service domain to handle verification requests. There are multiple ways to implement this including using an include mechanism or a redirect modifier term. Some providers adopt a process where that mechanism or modifier is represented in the client's top-level policy with macro terms that facilitate auxiliary message information flow to the service. Others take the approach of simply mapping the policy that represents the client's legitimate sending into an effective policy hosted on their servers. In any case, the present disclosure refers to such an SPF service provider designation term more simply hereafter as simply a 'service designation term'.

The Consequences of SPF Service Provider Disruption

Since SPF service providers have been in existence, the ubiquitous process for implementing a service designation term involves replacing the domain's legacy SPF policy and appending a trailing all term. Such a policy may look like the following depiction:

"v=spf1 include:spf-service-provider.com-all"

Subsequent message verification attempts will be channeled to the service provider who will, in turn, supply passing authorization results if appropriate. Using this process, when the SPF service provider suffers a service interruption or other upstream system outages that affect its ability to communicate with SPF message verifiers, the results of authorization checks may result in the receiving mailbox providers denying delivery to the inboxes that they control.

Depending on the nature of the service disruption, the results of SPF authentication testing the service designation term may result in a 'permerror' or a 'temperror'. While 'permerror' immediately aborts the SPF verification process, the manner by which a 'temperror' is handled is more implementation and local-policy specific. The standards specification states that a "temperror" result means the SPF verifier encountered a transient (generally DNS) error while performing the check.

Checking software can choose to accept or temporarily reject the message. In either of these error cases, deliverability of legitimate messages may suffer a disruption.

Local Management of Legacy Policies

Consistent with embodiments of the present disclosure, SPF service providers that are delegated the duties of policy management and hosting instruct their clients to configure an SPF policy that designates the service provider as a supplier of responses to SPF verification requests. Implementations of this scheme very often result in a policy depicted here:

v=spf1 include:_spf.serviceprovider.com~all

Aside from the mandatory version term (v=spf1) and the trailing all term, the single functioning policy term could be implemented as the include term as shown here, using other mechanisms, or using a redirect modifier (without the all). In particular, a legacy policy that may have existed before delegating SPF service to the provider becomes unavailable to message verifiers, as the service provider has taken on the functional responsibilities of SPF.

In accordance with embodiments of the present disclosure, a domain owner may retain their legacy SPF policy. A depiction of how this may be implemented is depicted in FIG. 1, illustrating a policy schema to effect inline SPF service provider designation.

The 'legacy policy terms' illustrated could be a functional set of terms directly added to the policy subsequent to the service designation term, or may be itself a high-level term that allows such policy terms to be hosted under a different domain name.

The various technical advantages offered to the domain owner by operating in this way may include simplified SPF service provider onboarding and policy failover redundancy to protect against SPF service provider disruptions, thus improving policy availability uptime.

Reducing the Complexity of SPF Service Onboarding

An SPF service provider must be responsible for producing verification results that accurately reflect the legitimate message flows for the domain. Replacing the functions of an existing policy with provider's service designation terms means that updates to a domain's intended policy must be managed exclusively through the service provider. The policy management then may require something outside of the traditional DNS editing typically performed for updating self-hosted SPF records; getting a one-to-one correspondence with a pre-existing functional policy then may be a source of resistance to transitioning to the SPF service provider. One can also envision cases where a domain owner may wish to discontinue the SPF service or to switch to a different provider. In such a case, the domain owner may have to accurately construct policy terms that are canonically equivalent in effect to how the service provider determines verification results.

Embodiments of the present disclosure enable an SPF service provider to implement to allow the domain's existing policy to remain as functioning constituent terms in the top-level policy or via a dedicated mechanism or modifier that directs SPF verifiers to the legacy policy after non-matching evaluation of the service's term. Thus, onboarding with an SPF service provider may no longer require removal of an existing record; instead, the domain owner only has to prepend the provider's service designation term (include, etc.) to the existing record. Thus, a fully onboarded policy may resemble the following policy. Note that terms may be line-wrapped to fit on the page:

"v=spf1 include:spf-service-provider.com mx a
include:_spf.google.com include:_spf.some_esp1.com
include:_spf.another_esp2.com -all"

Automated SPF Service Provisioning Using Existing Policies

Embodiments of the present disclosure enable an SPF service provider to implement an inline method to direct verifiers to their system may actively use the legacy policy to accommodate accurate results to verification requests. For example, if a service provider is performing SPF policy flattening by managing lists of IPs, then the legacy policy could be regularly harvested for those IPs to use in verification requests to the service.

Improving Redundancy Through Legacy Policy Evaluation

Embodiments of the present disclosure provide a proposed scheme as a method to partition a domain's SPF policy into effectively active service provider term inline with persisting policy constituents, which may further be, in some embodiments, self-hosted by the domain owner.

According to the standards specification, if the DNS lookup returns a server failure (RCODE 2) or some other error (RCODE other than 0 or 3), or if the lookup times out, then check_host( ) terminates immediately with the result "temperror".

The DNS message response codes corresponding to RCODEs 0 and 3 respectively are 'No Error' and 'Non-Existent Domain'. The message response code for RCODE of 2 is 'Server Failure'.

Furthermore, the specification states that, if the DNS lookup returns a server failure (RCODE 2) or some other error (RCODE other than 0 or 3), or if the lookup times out, then check_host( ) terminates immediately with the result "temperror".

Figure 2:
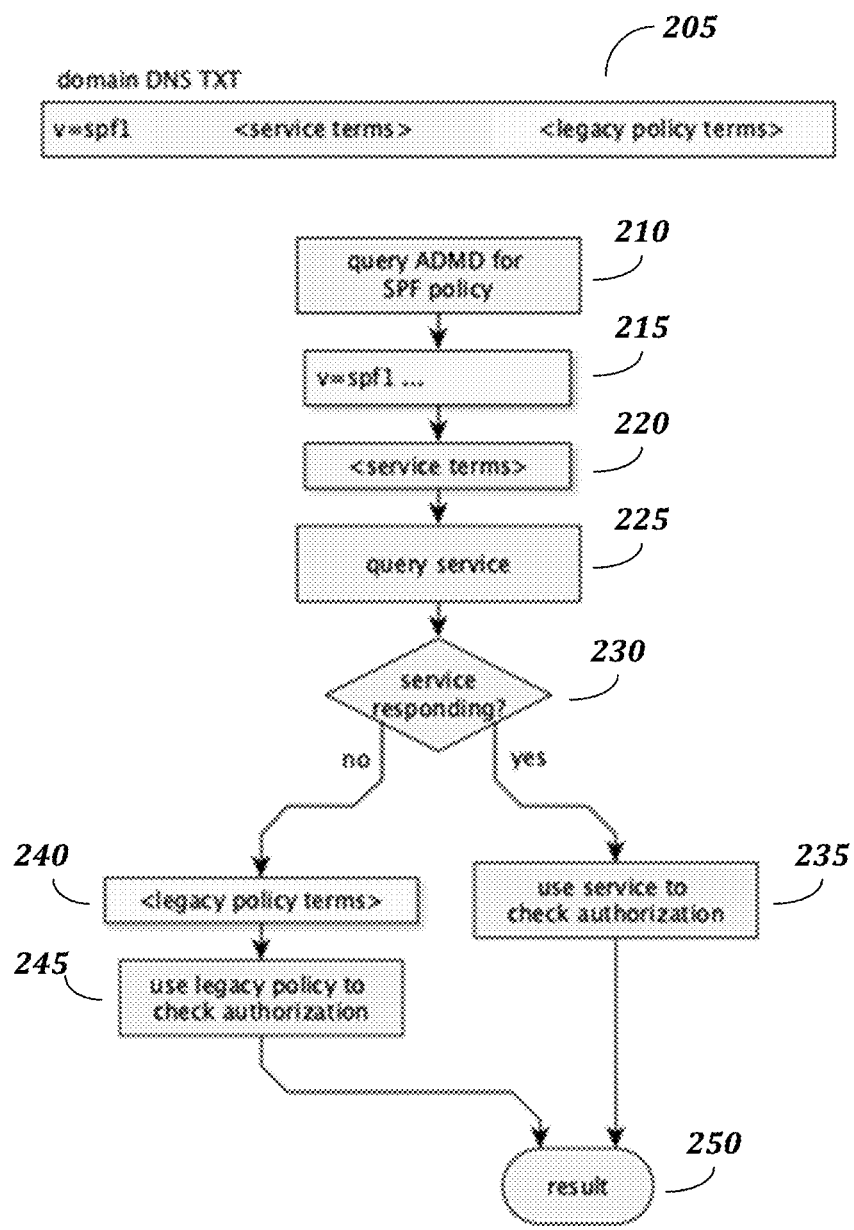
FIG. 2 illustrates a flow diagram consistent with embodiments of the present disclosure.

When using the inlining method consistent with embodiments of the present disclosure, a functional legacy policy can still persist and serve as a redundancy to message authorization check failures that may occur during an SPF service disruption. A flow diagram for this redundancy is depicted in FIG. 2, illustrating an SPF verification flow with inline service provider designation term. In the event that the service provider has a service interruption, the legacy policy can serve as a redundant path to authorization checks.

If no fail-over policy is available, then the verification result will be the default 'neutral' unless there is an all term, whereby its qualifier will be returned. Thus, a message that normally should 'pass' would fail with a top-level-all.

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 500 may be employed in the performance of some or all of the stages disclosed with regard to the methods. Similarly, an apparatus may be employed in the performance of some or all of the stages of the methods. As such, the apparatus may comprise at least those architectural components as found in computing device 500.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

FIG. 2 is a flow chart setting forth the general stages involved in a method 200 consistent with an embodiment of the disclosure for providing a platform consistent with embodiments of the present disclosure. Method 200 may be implemented using a computing device 500 or any other component associated with the platform as described in more detail below with respect to FIG. 5. For illustrative purposes alone, computing device 500 is described as one potential actor in the follow stages.

Method 200 may begin at starting block in which an SPF schema 205 is received and proceed to stage 210 where computing device 500 may query an ADMD for an SPF policy associated with the domain.

From stage 210, where computing device 500 query the ADMD for the SPF policy, method 200 may advance to stage 215 where computing device 500 may process the first term of the schema, read the service terms at stage 220, and proceed to the query service at stage 225. A response from SPF service may then be received at stage 230.

From stage 230, if a response is received, then the SPF service may be used to check authorization at stage 235. If no response is received, then the legacy policy terms at stage 240 may be read, and the legacy policy may be used to check authorization at stage 250. It is in such instances, when applying the "virtual all" term, that the term may be designed to "fail open", to allow for the pass through processing of the legacy policy terms.

Once computing device 500 has completed the check authorization, method 200 may then end at stage 250 with a result.

SPF Term Regulation

Figure 3:
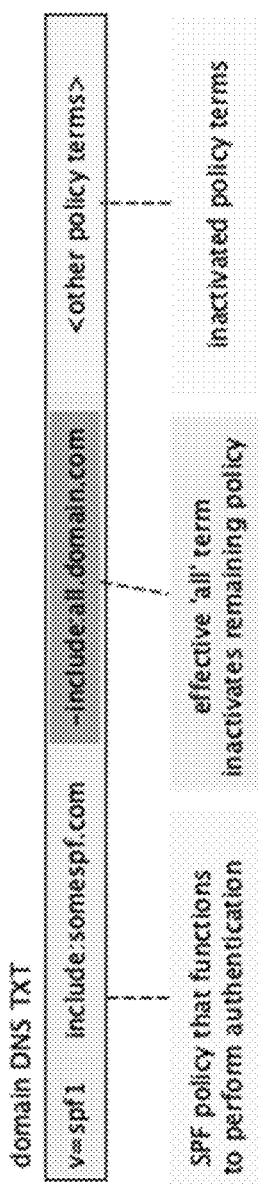
FIG. 3 illustrates another SPF schema consistent with embodiments of the present disclosure.
Figure 4:
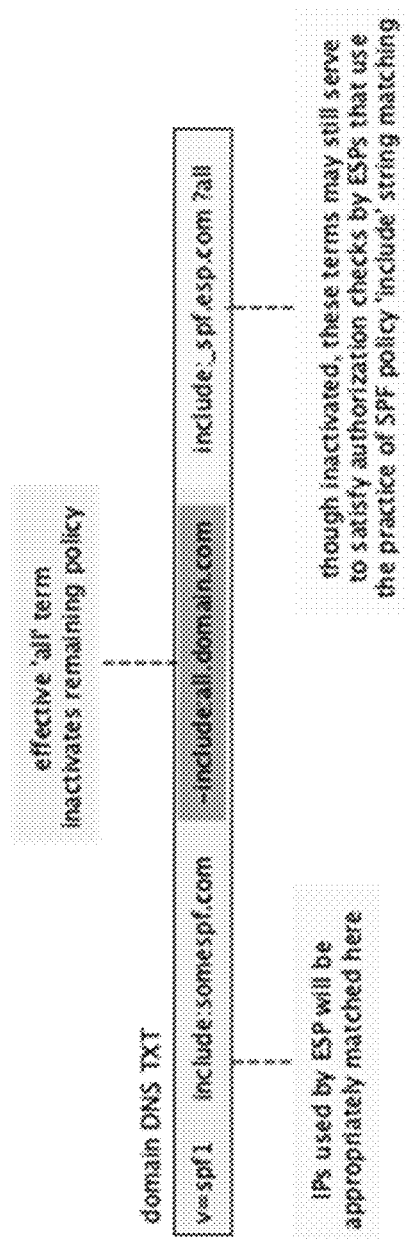
FIG. 4 illustrates yet another SPF schema consistent with embodiments of the present disclosure.

The various aspects of the present disclosure may be combined with related disclosure as provided by U.S. patent application Ser. No. 17/504,423 filed on even date herewith, in the name of Keith Wayne Coleman and Richard Duncan, entitled "REGULATION OF SPF POLICY TERMS," assigned to the assignee of the present application, is hereby incorporated, in its entirety, by reference. FIG. 3 and FIG. 4 illustrate such policy terms used in combination with the embodiments presented herein. Specifically, the other policy terms, following the "virtual all" term may serve as the local policies disclosed herein. In some embodiments, the virtual all term may be constructed as the inverse of the active terms. In this way, the legacy policies may be evaluated.

This includes, but is not limited to, an ability to combine a primary policy and one or more fallback policies in a single SPF policy. When the primary policy is online, a virtual all term may serve to terminate policy evaluation much like a traditional "all" term. If the primary policy is offline, the virtual all term may generate a "fail open," allowing policy evaluation to proceed into a previously inactivated segment of the policy.

Embodiments of the present disclosure may provide an SPF compression service configured to perform the following example:

```
v=spf1   mx   a:d.vendor1.fr   a:d.vendor2.com   include:_spf.vendor3.com
include:_spf.vendor4.com   include:_spf00##.vendor5.net   include:email.vendor6.com
include:mail.vendor7.com   include:vendor8.net   include:spf.vendor9.com
include:spf.protection.vendor0.com -all
```

Here, embodiments may provide a compressed policy as follows:

v=spf1 include:_s8 #-##9.invention.net~all

In turn, the virtual all term may be leveraged to add redundancy as well as supporting email service provider record validation (because the ESP can see their desired term 'include:sendgrid.net' in the policy). As an example, such a policy may look like:

```
v=spf1 include:_s88347569.fdmarc.net -include:virtual-all mx a:d.vendor1.fr
a:d.vendor2.com         include:_spf.vendor3.com         include:_spf.vendor4.com
include:_spf0097.vendor5.net   include:email.vendor6.com   include:mail.vendor7.com
include:vendor8.net include:spf.vendor9.com include:spf.protection.vendor0.com -all
```

Hardware Implementation

The various aspects of the present disclosure may be provided by a technical platform. The platform may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform may be hosted on a centralized server, such as, for example, a cloud computing service. The various methods been described may be performed by a computing device associated with a platform. It should be understood that, in some embodiments, different operations may be performed by different networked elements in operative communication with the computing device.

This disclosure further provides one or more examples of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device may be employed in the performance of some or all of the stages disclosed with regard to the methods.

Furthermore, although the stages of the example methods are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

The computing device may comprise a system having a memory storage and a processing unit. The processing unit coupled to the memory storage, wherein the processing unit is configured to perform the stages of the various methods herein.

Figure 5:
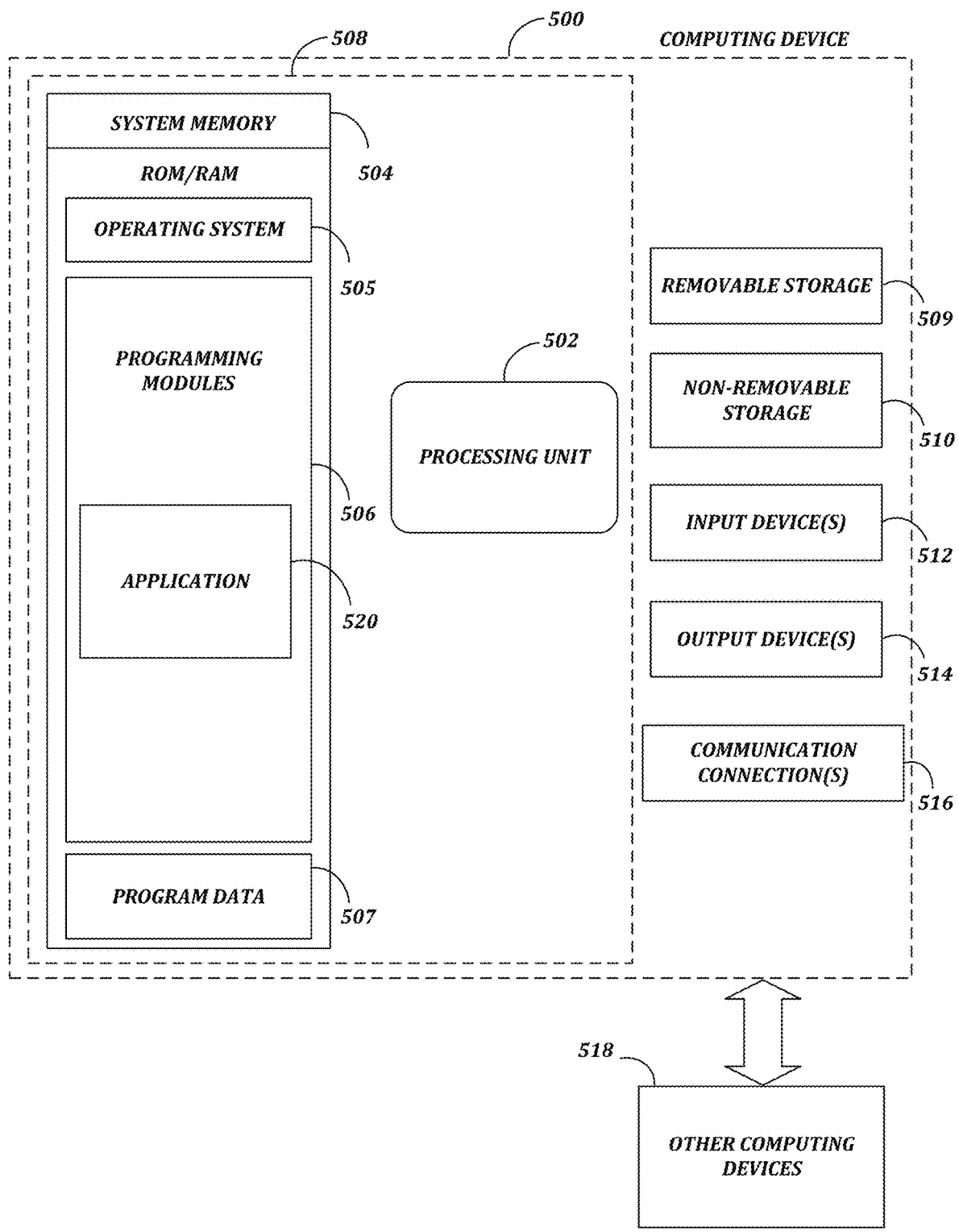
FIG. 5 is a block diagram of a system including a computing device for providing a platform consistent with embodiments of the present disclosure.

FIG. 5 is a block diagram of a system including computing device 500. Consistent with an embodiment of the disclosure, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the disclosure.

With reference to FIG. 5, a system consistent with an embodiment of the disclosure may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include an SPF policy controller configured to create, modify, or remove SPF policies on behalf of its users. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g., SPF controller application 520) may perform processes including, for example, one or more of the methods as described above. The aforementioned process is an example, and processing unit 502 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and other form of solid state storage. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or an optical drive, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A method comprising:
providing at least one active policy service term for inclusion in a Sender Policy Framework (SPF) policy used to delegate functional policy hosting and management to an administratively independent domain,
wherein the at least one active policy service term is provided for insertion into the SPF policy prior to a pre-existing policy term of the administratively independent domain,
and wherein the at least one active policy term is created based on one or more of:
the pre-existing policy term in a same Domain Name System (DNS) record as the SPF policy,
a policy term in an adjacent DNS record, or
a policy term in an adjacent DNS row.

2. The method of claim 1, further comprising onboarding an SPF service provider without removal of an existing SPF record.

3. The method of claim 2, wherein onboarding the SPF service provider comprises prepending the at least one active policy service term to the pre-existing policy term of the existing SPF record.

4. The method of claim 1, wherein the at least one active policy service term is comprised of a service designation term from an SPF service provider.

5. The method of claim 4, wherein the at least one active policy service term further comprises a virtual all term.

6. The method of claim 5, wherein the virtual all term is configured to fail open to enable a pass-through policy evaluation of the pre-existing policy term when the SPF service provider is irresponsive.

7. The method of claim 1, wherein the inclusion of the at least one active policy service term keeps the pre-existing policy term.

8. The method of claim 7, wherein the pre-existing policy term remains as a redundant back-up in the event the administratively independent domain is unresponsive.

9. The method of claim 1, wherein the pre-existing policy term of the administratively independent domain remains inactive and is not evaluated subsequent to a match provided by the at least one active policy service term.

10. The method of claim 9, wherein inserting the at least one active policy service term comprises moving the pre-existing policy term to an adjacent DNS line.

11. The method of claim 1, wherein inserting the at least one active policy service term comprises moving the pre-existing policy term to an adjacent DNS record.

12. The method of claim 1, wherein the pre-existing policy term of the administratively independent domain comprises a high-level term that allows the pre-existing policy term to be hosted under a different domain name.

13. One or more non-transitory computer readable media comprising instructions which, when executed by one or more hardware processors, causes performance of operations comprising:
providing at least one active policy service term for inclusion in a Sender Policy Framework (SPF) policy used to delegate functional policy hosting and management to an administratively independent domain,
wherein the at least one active policy service term is provided for insertion into the SPF policy prior to a pre-existing policy term of the administratively independent domain,
and wherein the at least one active policy term is created based on one or more of:
the pre-existing policy term in a same Domain Name System (DNS) record as the SPF policy,
a policy term in an adjacent DNS record, or
a policy term in an adjacent DNS row.

14. The one or more computer readable media of claim 13, wherein the at least one active policy service term is comprised of a service designation term from an SPF service provider.

15. The one or more computer readable media of claim 14, wherein the at least one active policy service term further comprises a virtual all term.

16. The one or more computer readable media of claim 15, wherein the virtual all term is configured to fail open to enable a pass-through policy evaluation of the pre-existing policy term when the SPF service provider is irresponsive.

17. The one or more computer readable media of claim 13, wherein the inclusion of the at least one active policy service term keeps the pre-existing policy term.

18. The one or more computer readable media of claim 13, wherein the pre-existing policy term of the administratively independent domain remains inactive and is not evaluated subsequent to a match provided by the at least one active policy service term.

19. The one or more computer readable media of claim 13, wherein inserting the at least one active policy service term comprises moving the pre-existing policy term to an adjacent DNS line.

20. The one or more computer readable media of claim 13, wherein the pre-existing policy term of the administratively independent domain comprises a high-level term that allows the pre-existing policy term to be hosted under a different domain name.

\* \* \* \* \*